(12) United States Patent
Mao et al.

(10) Patent No.: US 9,038,140 B2
(45) Date of Patent: May 19, 2015

(54) INTEGRATED COLLABORATION ENVIRONMENT

(71) Applicant: SAP AG, Walldorf (DE)

(72) Inventors: Weicheng Mao, Shanghai (CN); Ziqiang Huang, Shanghai (CN); Hua Wang, Shanghai (CN); Xueyong Gong, Shanghai (CN); Michael Rey, Speyer (DE)

(73) Assignee: SAP SE (DE)

( * ) Notice: Subject to any disclaimer, the term of this patent is extended or adjusted under 35 U.S.C. 154(b) by 142 days.

(21) Appl. No.: 13/678,529

(22) Filed: Nov. 15, 2012

(65) Prior Publication Data

US 2014/0130135 A1 May 8, 2014

(30) Foreign Application Priority Data

Nov. 8, 2012 (CN) .......................... 2012 1 0442972

(51) Int. Cl.
G06F 17/30 (2006.01)
G06F 21/00 (2013.01)
G06Q 10/06 (2012.01)

(52) U.S. Cl.
CPC .......... *G06Q 10/06311* (2013.01); *G06Q 10/06* (2013.01)

(58) Field of Classification Search
CPC ......... H04L 63/08; H04L 63/10; H04L 63/20; H04L 67/02; G06F 17/30165; G06F 21/00; G06F 21/10; G06F 21/31; G06F 21/41; G06F 21/60; G06F 21/604; G06F 21/627; G06F 21/6218; G06F 2221/2117
USPC .................. 726/2, 3, 4, 9, 12, 26, 27; 705/1.1
See application file for complete search history.

(56) References Cited

U.S. PATENT DOCUMENTS

| | | | |
|---|---|---|---|
| 2003/0018510 A1* | 1/2003 | Sanches ............................ 705/9 |
| 2004/0017397 A1* | 1/2004 | Bach et al. ..................... 345/762 |
| 2011/0314420 A1* | 12/2011 | McFarlane et al. ........... 715/811 |
| 2012/0150973 A1* | 6/2012 | Barak ............................ 709/206 |

* cited by examiner

Primary Examiner — Joseph P Hirl
Assistant Examiner — Kalish Bell
(74) Attorney, Agent, or Firm — Horizon IP Pte. Ltd.

(57) ABSTRACT

Described herein is a technology for facilitating the integration of a collaboration environment. In some implementations, an activity associated with a business object is accessed via a work center. A request to post the activity is sent to a collaboration application. The collaboration application then returns an activity identifier, and the user is redirected to the activity identifier.

15 Claims, 4 Drawing Sheets

INITIATIVE

New Product Sales OPP

3426

Key Information

| | |
|---|---|
| Status: | In Preparation |
| Priority: | Very High |
| Person Responsible: | Shabana Ansari |
| Start Date: | 17.01.2012 |
| End Date: | 30.01.2012 |
| Description: | For Class A custome... |

Administration Data

| | |
|---|---|
| Created On: | 17.01.2012 08:49 CET |
| Created By: | WANGHUAD |
| Changed On: | 17.01.2012 08:51 CET |
| Changed By: | WANGHUAD |

[Changes Status] [Close]

Target Group  Activities

[Add] | [Remove]

| Activity ID | Type | *Description |
|---|---|---|
| 1 | Activity | Sales Opp for new Product 100-100 |

Activity: https://www.123.com/activities/_5-FKI4QiGeid89MyeJN2C

402 → INITIATIVE block
404 → Activities tab
406 → Activity URL
400 → overall screen

*Fig. 4*

INTEGRATED COLLABORATION ENVIRONMENT

TECHNICAL FIELD

The present disclosure relates generally to software applications, and more particularly, to an integrated collaboration environment.

BACKGROUND

Customer relationship management (CRM) software is a type of enterprise software commonly used for managing a company's interactions with customers, clients and sales prospects. CRM software allows users to enter information related to activities (or tasks) into a database, so that they can be tracked and managed. These activities may include various sales, marketing, customer service and/or technical support activities, such as opportunity management. To find and induce new and existing customers to buy its products and services, for example, a company may use analytics provided by a CRM software to discover consumer trends from business data (e.g., survey, demographic data) and guide decisions for consumer segmentation, targeting, testing, campaigning and measuring.

Each of these activities can be complex, time consuming and expensive. More than one person is usually required to perform the actual work to complete these activities. To facilitate collaboration, unstructured or uncontrolled communications means, such as conference calls, emails, face-to-face meetings, short messages (e.g., replies on one topic), etc., are often employed to share information and discuss issues. However, it may be difficult to accurately manage and track the progress of each activity in the CRM software.

Therefore, there is a need for an improved collaboration environment that addresses the above-mentioned challenges.

SUMMARY

A computer-implemented technology for facilitating integrated collaboration environment is described herein. In some implementations, an activity associated with a business object is accessed via a work center. A request to post the activity is sent to a collaboration application. The collaboration application then returns an activity identifier, and the user is redirected to the activity identifier.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows an exemplary user interface.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

The framework described herein may be implemented as a method, computer-controlled apparatus, a computer process, a computing system, or as an article of manufacture such as a computer-usable medium. These and various other features will be apparent from the following description.

Figure 1:
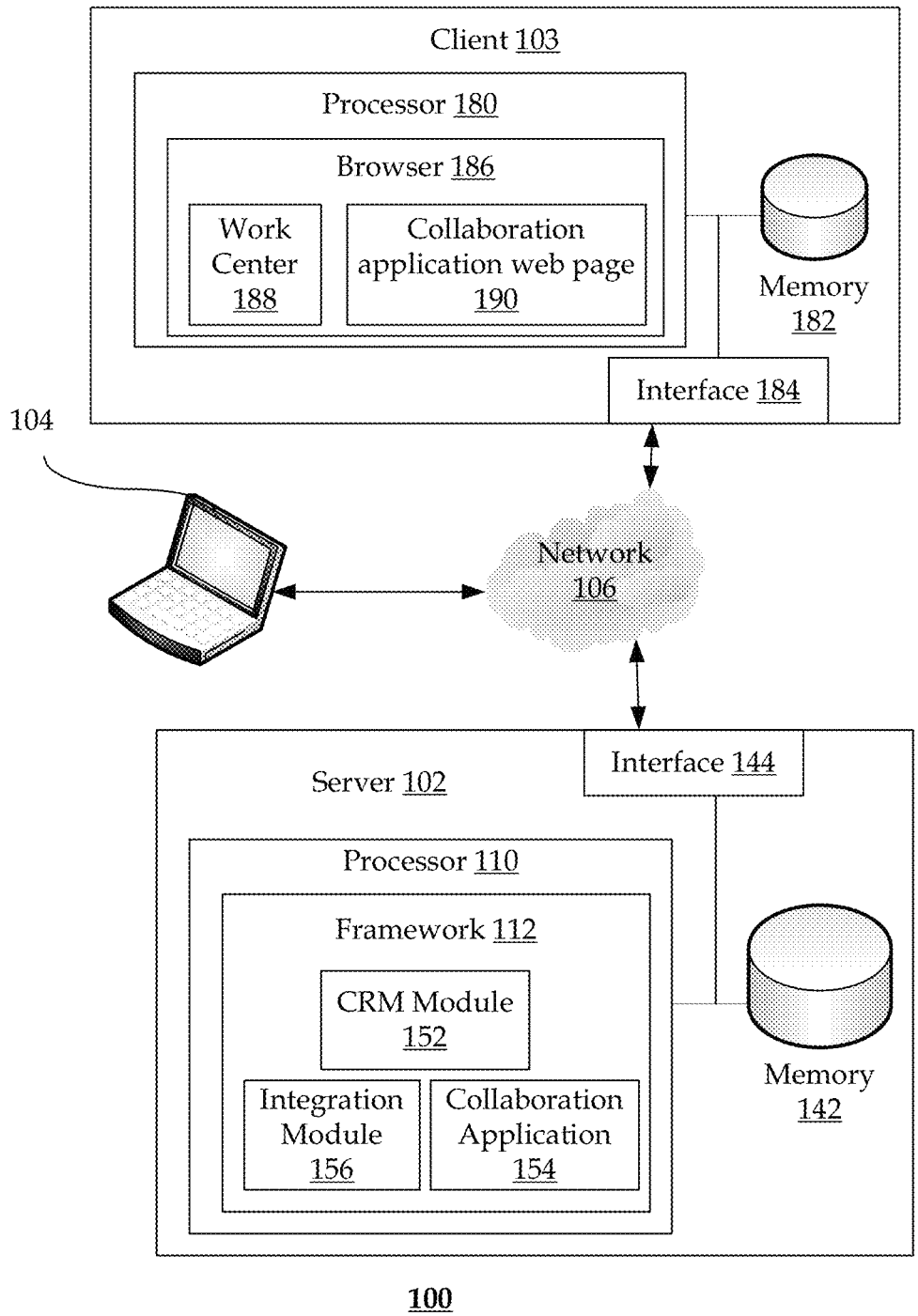
FIG. 1 is a block diagram illustrating an exemplary environment.

FIG. 1 is a block diagram illustrating an exemplary environment 100 that may be used to implement the framework described herein. The exemplary environment 100 includes or is communicatively coupled with a server 102, and one or more clients or client devices 103 and 104, and, at least some of which communicate across network 106. The environment 100 may also support one or more servers 102 operable to provide a set of services to the clients 103 and 104. For example, the server 102 may be a logical group of servers made accessible within a cloud computing network.

Server 102 may be any computing or processing device operable to receive, transmit, process, store or manage data or information associated with the environment 100. For example, the server 102 may be a blade server, workstation, laptop, tablet, etc. The server 102 may also be implemented using two or more servers 102, such as a server pool. In addition, the server 102 may be adapted to execute any operating system, including Linux, UNIX, Windows, Mac OS, or any other suitable operating system.

As shown, the server 102 may include a processor 110, a non-transitory memory 142 and an interface 144. It may further include an input device, such as a keypad, touch screen, mouse, or other device that can accept user information, and an output device that presents information.

Generally, memory 142 may include any memory or database module for storing data and program instructions. Memory 142 may take the form of volatile or non-volatile memory including, without limitation, magnetic media, optical media, random access memory (RAM), read-only memory (ROM), removable media, or any other suitable local or remote memory component. Memory 142 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its hosted framework 112.

Memory 142 may also store data, such as business objects, transactional and analytical data as well as other business data, associated with the CRM module 152 and collaboration application 154. In some instances, memory 142 can function as an in-memory database to store the data. The in-memory database is a database management system that primarily relies on a system's main memory for efficient computer data storage to allow seamless access to and propagation of data in real-time. The data in the in-memory database resides in volatile memory and is not persistently stored on a hard drive.

Interface 144 is used by the server 102 for communicating with other systems (e.g., clients 103 and 104) in a client-server or other distributed environment (including environment 100) connected to the network 106, as well as other systems communicatively coupled to the network 106. The interface 144 may include logic encoded in software and/or hardware in a suitable combination and operable to communicate with the network 106.

The processor 110 is operable to execute one or more hosted applications, such as the framework 112 described herein. The framework 112 may include a customer relationship management (CRM) module 152, an integration module 156, and/or a collaboration application 154. It should be understood that one or more of these modules, or a portion thereof, may be hosted by other servers. In some instances, the server 102 may store a plurality of hosted applications, while in other instances, the server 102 may be a dedicated server meant to store and execute only a single hosted application.

In FIG. 1, the CRM module 152 generally provides various functionalities to automate various business processes, or to otherwise provide automated support for various aspects of customer relationship management. For instance, the CRM module 152 may provide automated support for sales, marketing, and customer service for a business to establish, maintain and grow the customer base over a lifetime of an enterprise. In some implementations, the CRM module 152 may include an analytics sub-module for mining or analyzing data gathered by the CRM module 152 and provide the results to a user to, for example, identify new sales opportunities, generate initiatives to induce new customers, increase profitability, or otherwise facilitate the job of the user. The analytics sub-module may also process data associated with a marketing campaign, a customer call center or any other initiative to determine its success in expanding the customer base.

The collaboration application 154 provides a structured communications interface for users to participate in collaborations. In some instances, the server 102 comprises a web server or is communicatively coupled with a web server, where the collaboration application 154 represents one or more web-based applications accessed and executed via network 106 by the clients 103 and 104 to perform the programmed tasks or operations of the collaboration application 154. The collaboration application 154 may be available to a client, such as client 103 or 104, through a web browser-based application at the client 103 or 104. In some instances, the collaboration application 154 includes an enterprise social networking tool that allows users to work together on business activities, such as analyzing data, planning meetings or conferences, sharing knowledge, making decisions, etc. to achieve common goals. Examples of such enterprise social networking tools include Novell's Pulse, SAP Jam (previously known as StreamWork), Google Wave, Microsoft SharePoint, and so forth.

The integration module 156 serves to connect the CRM module 152 and the collaboration application 154, so as to provide an integrated collaboration environment. Other software components, devices and/or applications may also be connected via the integration module 156. In some instances, the integration module 156 allows a user of the CRM module 152 to interact with the collaboration application 154 via the interface 144. The user may be located at one of the client devices 103, 104 or at the server 102. The user may perform one or more work activities or tasks using the CRM module 152, and initiate collaboration with other participants by directly linking to the collaboration application 154 via a uniform resource locator (URL) generated by the integration module 156, as will be described in more details later.

As shown in FIG. 1, the exemplary environment 100 may also include one or more clients 103, 104. Client 104 may represent a client that may participate in a collaboration with client 103. Each client 103, 104 may be any computing device operable to connect to or communicate with at least the server 102 and/or via the network 106 using a wired or wireless connection, such as a personal computer, touch screen terminal, workstation, network computer, kiosk, wireless data port, smart phone, personal data assistant (PDA), one or more processors within these or other devices, or any other suitable processing device. In addition, clients 103, 104 may persist in a cloud based network.

In some instances, each client 103, 104 includes a processor 180, an interface 184 and a non-transitory memory 182, which may be similar to those found in server 102. It may also include an input device, such as a keypad, touch screen, mouse, or other device that can accept user information, and an output device that presents information, including digital data, visual information, a graphical user interface, or browser 186.

In some implementations, the processor 180 is operable to execute a browser 186. Browser 186 represents a web browser or program that serves as a user agent with which to access network content. In some implementations, browser 186 may be used to display a work center 188 and a collaboration application web page 190. Work center 188 represents one or more software applications in which the user may perform work-level actions or activities. In some instances, work center 188 communicates with an enterprise application hosted on server 102, such as the CRM module 152, to enable the user to utilize one or more callable enterprise services. Collaboration application web page 190 provides a user interface to access, join, and/or participate in a collaboration managed by collaboration application 154 hosted on server 102.

Network 106 may include any type of network, and represents both hardware and software or network protocol(s) with which client devices 103, 104 access server 102. Network 106 may include a local area network (LAN), a wireless LAN (WLAN), a virtual private network (VPN), virtual LAN (VLAN), wide area network (including the Internet), etc.

Figure 2:
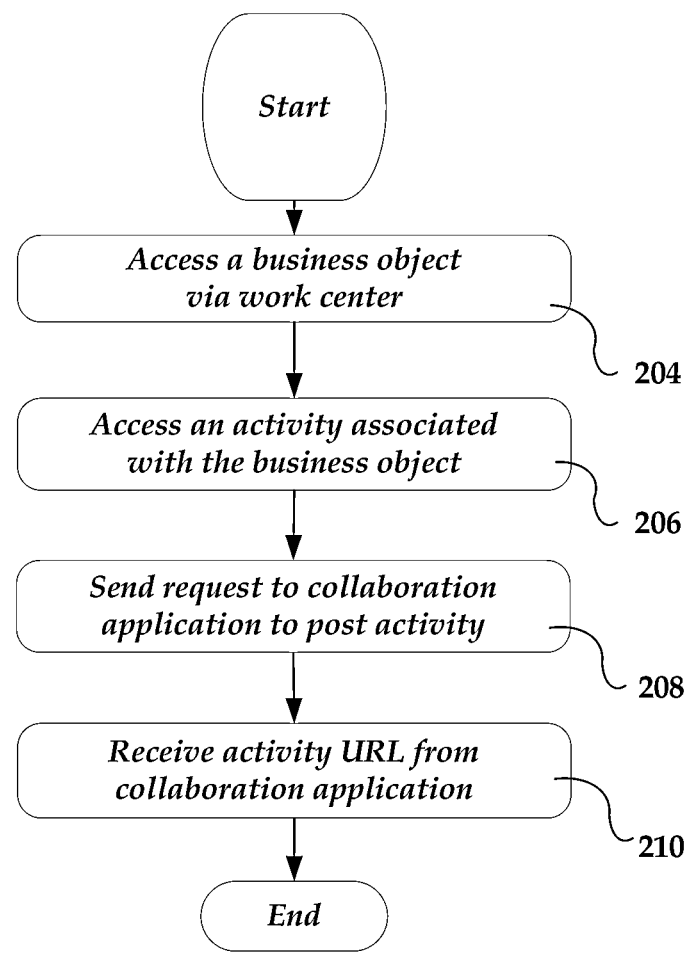
FIG. 2 illustrates an exemplary method for integrating a collaboration environment.

FIG. 2 illustrates an exemplary method 200 of integrating a collaboration environment in a work center 188 implemented in client 103.

At 204, a business object is accessed via the work center 188. A business object is a collection of data attribute values that are typically associated with a principal entity represented in a computing device or system, and it may be associated with callable services. Examples of a business object include information about a customer, an employee, a product, a business partner, a product, a sales invoice, a sales order, a sales opportunity or initiative. An initiative object, for instance, is a business object used in the process of discovering, designing and developing new products within a company, and introducing these products to the market, and can be used to track the decision flow management process (e.g., monitor the status of the decision points and phases). Each initiative object may include a set of attributes, and may have services (e.g., icons, questionnaires, scoring models) assigned to it.

To access the business object, the user may launch the work center 188 via the browser 186. In some implementations, the work center 188 provides a graphical user interface operable to allow the user of the client 103 to interface with at least a portion of the CRM module 152 to create, prepare, request, view, access, analyze or otherwise manage business data or business objects. The work center 188 may provide a plurality of frames or views having interactive fields, pull-down lists, menus and/or buttons operable by the user. Further, the user may request a business object, select from a number of available business objects, and enter information to create a business object through the work center 188. For example, the user may create or access an initiative business object to develop a new sales opportunity.

At 206, an activity associated with the business object may be accessed via the work center 188. This step may be performed in response to, for example, the user selecting a menu option to create, view or otherwise access an activity via the user interface provided by the work center 188. An activity is generally a type of business data that describes a set of one or more tasks that may be performed through collaboration. For instance, in an initiative to induce a potential customer, an activity associated with the initiative may include steps or tasks involving various participants. The user may collaborate with other participants to communicate, meet and follow-up with the potential customer, exchange information, monitor progress on common tasks, etc. Such collaboration may be facilitated by, for example, the environment provided by the collaboration application 154. By allowing the user to access a collaborative activity without having to leave the work center 188, seamless integration with the collaboration application 154 is achieved.

At 208, the work center 188 sends a request (e.g., HTTP POST) to the collaboration application 154 in the server 102 to post the activity. The request may be sent in accordance with an authorization protocol, as will be described in more detail with respect to FIG. 3.

At 210, the client 103 receives an activity identifier from the collaboration application 154 via the integration module 156. In some implementations, the activity identifier is a uniform resource locator (URL) that represents the address of the service provided by the collaboration application 154, and links the user directly to the collaboration application 154 for accessing or managing the activity. The activity identifier may be stored in the business object and displayed in the work center 188.

The user may be redirected to the activity identifier. For example, the collaboration application web page 190 may be automatically launched in a new browser window in response to the user selecting the activity identifier. Alternatively, the collaboration application web page 190 may be displayed as embedded within the work center 188. In addition, the client 103 may display a message of successful activity creation, such as a textual and/or graphical message.

Figure 3:
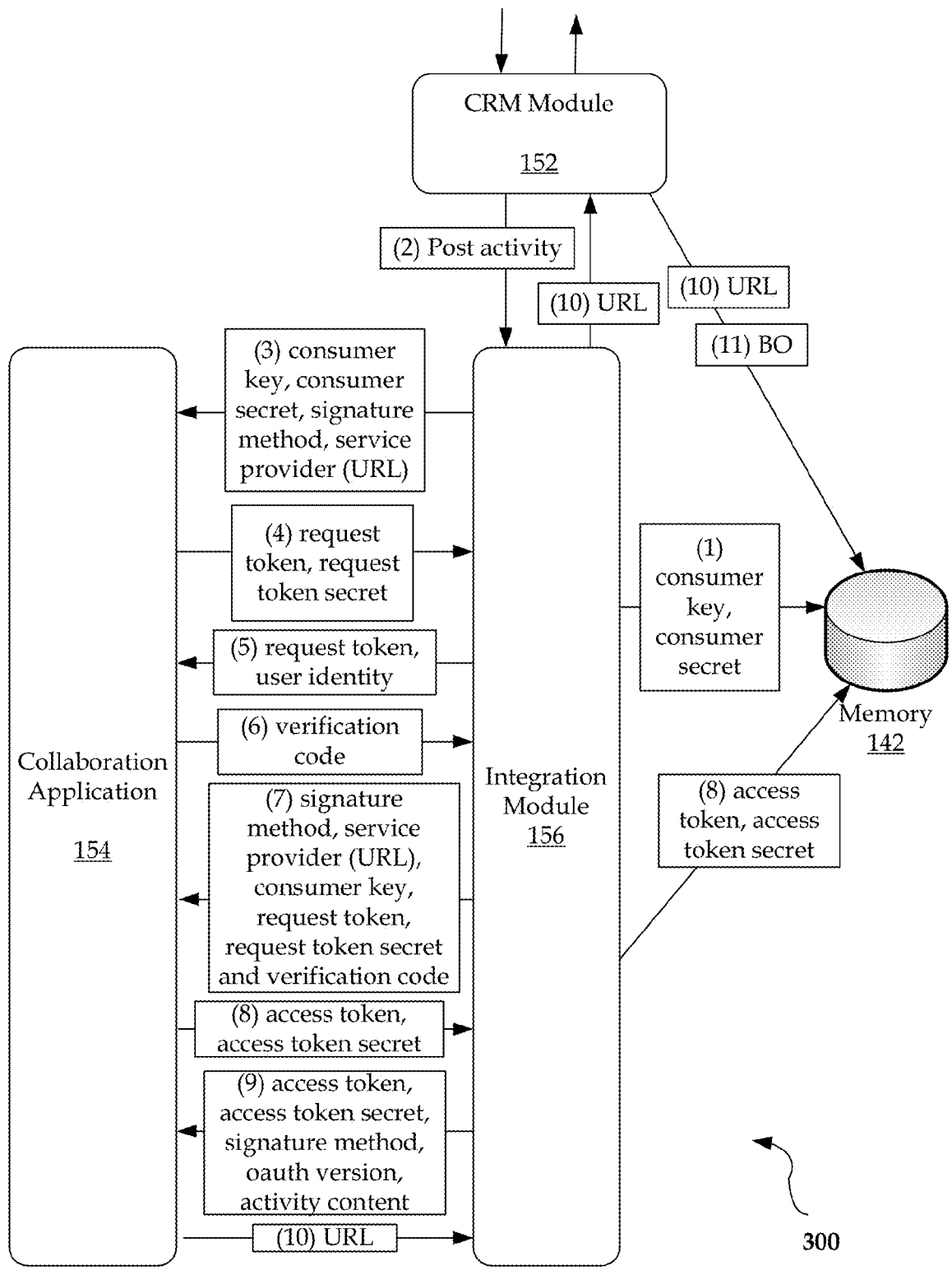
FIG. 3 illustrates an exemplary environment for connecting to the collaboration application.

FIG. 3 illustrates an exemplary environment 300 for connecting to the service provided by the collaboration application 154. By way of example, the environment 300 uses an authorization protocol, such as Open Authorization ("OAuth"). It should be understood that other types of authentication protocols may also be employed. OAuth is an open protocol for authorization that enables users to share their private data between different Web sites along with their credentials, but only expose the data on the original Web site where it is held. It allows users to share private resources stored on one Web site with other sites without exposing the users' credentials (e.g., usernames and passwords) to Web sites other than the one holding the users' data.

During design time, the integration module 156 registers with the collaboration application 154. Design time generally refers to the environment and tools used to create, administer, and configure content, systems, and services used in a computer system, so as to ensure a smooth runtime environment. The integration module is registered as a third party application with the collaboration application 154. Upon registration, the integration module 156 is issued a consumer key and a consumer secret (1) that uniquely identify the integration module 156 in the environment 300. The registered integration module 156 is now permitted to access, on behalf of end users, one or more protected resources or services provided by the collaboration application 154 via an authorization protocol (e.g., OAuth).

The integration module 156 may store the consumer key and consumer secret (1) in the memory 142 for subsequent use. Generally, the consumer key and consumer secret (1) represent the credentials of the integration module 156 within the environment 300. More particularly, a consumer key is a value (e.g., string) that is used by the integration module 156 (or consumer) to identify itself to the collaboration application 154 (or service provider), while a consumer secret refers to a secret used by the integration module 156 (or consumer) to establish ownership of the consumer key. The consumer key and consumer secret (1) are used by an authorization protocol, such as OAuth, to enable the integration module 156 to access protected resources or services at the collaboration application 154.

During run-time, an activity may be accessed via the work center 188. Run time generally refers to the environment in which users perform their daily tasks, according to the roles defined for them within the organization. The activity may be associated with a business object stored in the memory (e.g., in-memory database) of the server 102. Upon a user initiating access to the activity, the CRM module 152 may issue a "post activity" request (2) to the integration module 156. The request (2) indicates a desire to access one or more protected resources or services at the collaboration application 154.

The integration module 156 then sends a request (3) to the collaboration application 154 to obtain a request token and request token secret (4). The request (3) may be a HTTP request (e.g., HTTP POST) that is sent to the request token URL of the collaboration application 154. The request (3) may be signed, and include the consumer key, the consumer secret, signature method (e.g., HMAC-SHA1, RSA-SHA1, PLAINTEXT, etc.), the service provider request token URL, and/or other parameters. The collaboration application 154 responds by returning a request token and request token secret (4). A request token is generally a value (e.g., string) used by the integration module 156 (or consumer) to obtain authorization from the user, and is exchanged for an access token. A request token secret is used by the integration module 156 (or consumer) to establish ownership of the request token.

The integration module 156 then sends a request (5) for a verification code (6). The request (5) may include the request token and user identity. The user identity is obtained by, for example, redirecting the user to the "authorize URL" and prompting the user to logon to the collaboration application 154. This redirection may be achieved by displaying a pop-up window or within the work center 188 environment. Once the user explicitly grants the integration module 156 access to the collaboration application 154 on the user's behalf, the collaboration application 154 proceeds to verify the user's identity and return a verification code (6) upon successful verification.

The integration module 156 then sends a request (7) to the collaboration application 154 for an access token and access token secret (8). The request (7) may be a HTTP request (e.g., HTTP POST) that is sent to the access token URL of the collaboration application 154 (or service provider). The request (7) may be signed, and include the signature method, the service provider URL, the consumer key, the request token, the request token secret, verification code and/or other parameters. Once the collaboration application 154 verifies the request signature and matches the request token to the consumer key, it generates an access token and access token secret (8). Upon receipt, the integration module 156 stores the access token and access token secret (8) in the memory 142.

The access token and access token secret (8) may be used when signing requests to access protected resources or services at the collaboration application 154 on behalf of the user. For example, the integration module 156 may send a request (9) to post an activity created using the work center 188 via the browser 186. The request (9) is signed using the access token and access token secret (8), and may include the access token, access token secret, signature method, OAuth version, activity content, and/or other parameters. Upon successful verification, the collaboration application 154 then constructs and returns the activity URL (10) for the new activity. The activity URL (10) is then returned to the CRM module 152, and can be used to link the user directly to the collaboration application 154. The activity URL (10) may also be stored with the business object (11) in the memory 142 for subsequent use.

FIG. 4 shows an exemplary user interface 400 of the work center 188. The user interface 400 may be rendered using a web browser 186 at the client device 103. The user interface 400 enables the user to create an Initiative 402 for discovering, designing and developing a given product. Within the Initiative interface, the user may create a new activity 404 for exploring a new sales opportunity that has been identified for the given product. To facilitate collaboration associated with the activity 404, the work center 188 sends a request to the collaboration application 154 to post the activity. The collaboration application 154 processes the request, and returns an activity URL 406. Upon selecting the activity URL 406, the user may be redirected to the collaboration application 154 web page where he or she may interact or collaborate with other colleagues or team members. Alternatively, the collaboration application 154 web page may be embedded in the work center 188.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of integrating a collaboration environment, comprising:
    obtaining, by an integration module, via an authorization protocol, a consumer key and a consumer secret that represent credentials to access one or more protected resources or services provided by a collaboration application, wherein the collaboration application provides a structured communications interface for users to participate in a collaboration;
    accessing, by the integration module, via a work center, an activity associated with a business object, wherein the business object is stored in an in-memory database and the work center provides a user interface configured for a user to interact with at least a portion of a customer relationship management (CRM) module, wherein the activity describes one or more tasks to be performed through the collaboration;
    sending, from the integration module, to the collaboration application, a request to post the activity, wherein the request includes the consumer key and the consumer secret;
    after a user authorizes the integration module to access the collaboration application on the user's behalf, generating, by the collaboration application, an access token and an access token secret;
    sending, from the collaboration application, to the integration module, an activity identifier in response to receiving a request signed with the access token and the access token secret; and
    receiving, by the integration module, from the collaboration application, the activity identifier that links to the collaboration application.

2. A computer-implemented method of integrating a collaboration environment, comprising:
    obtaining, by an integration module, via an authorization protocol, a consumer key and a consumer secret that represent credentials to access one or more protected resources or services provided by a collaboration application, wherein the collaboration application provides a structured communications interface for users to participate in a collaboration;
    accessing, by the integration module, via a work center, an activity associated with a business object, wherein the activity describes one or more tasks to be performed through the collaboration;
    sending, from the integration module, to the collaboration application, a request to post the activity, wherein the request includes the consumer key and the consumer secret;
    after a user authorizes the integration module to access the collaboration application on the user's behalf, generating, by the collaboration application, an access token and an access token secret;
    sending, from the collaboration application, to the integration module, an activity identifier in response to receiving a request signed with the access token and the access token secret;
    receiving, by the integration module, from the collaboration application, the activity identifier; and redirecting, by the integration module, the user to the activity identifier.

3. The computer-implemented method of claim 2 wherein the business object comprises an initiative object.

4. The computer-implemented method of claim 2 wherein the work center provides a user interface configured for the user to interact with at least a portion of a customer relationship management (CRM) module.

5. The computer-implemented method of claim 4 wherein data associated with the CRM module is stored in an in-memory database.

6. The computer-implemented method of claim 2 wherein the collaboration application comprises an enterprise social networking tool.

7. The computer-implemented method of claim 2 wherein redirecting the user comprises automatically launching a web page of the collaboration application via a web browser.

8. The computer-implemented method of claim 2 wherein redirecting the user comprises automatically launching a web page of the collaboration application, wherein the web page is embedded within the work center.

9. The computer-implemented method of claim 2 wherein the activity identifier comprises a uniform resource locator (URL).

10. The computer-implemented method of claim 2 wherein the authorization protocol comprises OAuth.

11. The computer-implemented method of claim 2 further comprising storing the identifier with the business object for subsequent use.

12. A non-transitory computer-readable medium having stored thereon program code, the program code executable by a computer to:
- obtain, by an integration module, via an authorization protocol, a consumer key and a consumer secret that represent credentials to access one or more protected resources or services provided by a collaboration application, wherein the collaboration application provides a structured communications interface for users to participate in a collaboration;
- access, by the integration module, via a work center, an activity associated with a business object, wherein the activity describes one or more tasks to be performed through the collaboration;
- send, from the integration module, to the collaboration application, a request to post the activity, wherein the request includes the consumer key and the consumer secret;
- after a user authorizes the integration module to access the collaboration application on the user's behalf, generating, by the collaboration application, an access token and an access token secret;
- sending, from the collaboration application, to the integration module, an activity identifier in response to receiving a request signed with the access token and the access token secret;
- receive, by the integration module, from the collaboration application, the activity identifier; and
- redirect, by the integration module, the user to the activity identifier.

13. A system comprising:
- a non-transitory memory device for storing computer-readable program code; and
- a processor in communication with the memory device, the processor being operative with the computer-readable program code to:
  - obtain, via an authorization protocol, a consumer key and a consumer secret that represent credentials to access one or more protected resources or services provided by a collaboration application, wherein the collaboration application provides a structured communications interface for users to participate in a collaboration;
  - access, via a work center, an activity associated with a business object, wherein the activity describes one or more tasks to be performed through the collaboration;
  - send, to the collaboration application, a request to post the activity, wherein the request includes the consumer key and the consumer secret;
  - receive, from the collaboration application, an activity identifier;
    - wherein the collaboration application sends the activity identifier to the system in response to receiving, from the system, a request signed with an access token and an access token secret; and
    - wherein the access token and the access token secret are generated, by the collaboration application, after a user authorizes the system to access the collaboration application on the user's behalf; and
  - redirect the user to the activity identifier.

14. The system of claim 13 wherein the activity identifier comprises a uniform resource locator (URL).

15. The system of claim 13 wherein the authorization protocol comprises OAuth.

* * * * *